United States Patent
Chellappa et al.

(10) Patent No.: US 7,561,512 B1
(45) Date of Patent: Jul. 14, 2009

(54) METHOD AND SYSTEM FOR ENHANCING CRANKBACK HANDLING IN MULTI-PEER GROUP NETWORKS

(75) Inventors: Mahesh Chellappa, San Jose, CA (US); Krishna Sundaresan, Sunnyvale, CA (US); Chandrasekar Krishnamurthy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1094 days.

(21) Appl. No.: 10/646,452

(22) Filed: Aug. 21, 2003

(51) Int. Cl.
*H04L 12/28* (2006.01)

(52) U.S. Cl. .................... 370/217; 370/228; 370/237; 370/351; 709/239

(58) Field of Classification Search ............ None
See application file for complete search history.

(56) References Cited

U.S. PATENT DOCUMENTS

| | | | | |
|---|---|---|---|---|
| 5,831,975 A | * | 11/1998 | Chen et al. | 370/256 |
| 5,933,412 A | * | 8/1999 | Choudhury et al. | 370/218 |
| 6,111,881 A | * | 8/2000 | Soncodi | 370/395.32 |
| 6,456,600 B1 | * | 9/2002 | Rochberger et al. | 370/255 |
| 6,778,535 B1 | * | 8/2004 | Ash et al. | 370/395.21 |
| 7,002,906 B1 | * | 2/2006 | Basso et al. | 370/218 |
| 7,085,279 B1 | * | 8/2006 | Kumar et al. | 370/401 |
| 7,177,951 B1 | * | 2/2007 | Dykeman et al. | 709/249 |
| 7,283,467 B2 | * | 10/2007 | Rajsic et al. | 370/228 |

* cited by examiner

*Primary Examiner*—William Trost, IV
*Assistant Examiner*—Roberta A Shand
(74) *Attorney, Agent, or Firm*—Stolowitz Ford Cowger LLP

(57) ABSTRACT

A method for enhanced crankback handling in a multi-peer group network. The method includes receiving a first connection request from a node of a first peer group. Upon detection of a call failure within the second peer group, a crankback is transmitted from the second peer group to the first peer group. The crankback specifies a blocked interface at a first link between the first peer group and the second peer group. The crankback is transmitted from a node of the second peer group. A second connection request is subsequently received from the node of the first peer group. The second connection request uses a second link to the second peer group that avoids the call failure.

29 Claims, 4 Drawing Sheets

METHOD AND SYSTEM FOR ENHANCING CRANKBACK HANDLING IN MULTI-PEER GROUP NETWORKS

TECHNICAL FIELD

This invention relates to the field of computer system networking. More particularly, the present invention relates to an improved network system to handle connection failures.

BACKGROUND ART

The widespread deployment of large, interconnected computer system networks has transformed the nature of communication. The largest such network, the Internet, is a general purpose, public computer network which allows millions of computers all over the world, connected to the Internet, to communicate and exchange digital data with other computers also coupled to the Internet.

ATM (Asynchronous Transfer Mode) is a network technology for both local and wide area networks (LANs and WANs) and the Internet that supports realtime voice and video as well as data. ATM technology is often deployed on such networks because of its ability to provide consistent network connections. The ATM topology uses switches that establish a logical circuit from end to end, which guarantees quality of service (QoS). However, unlike telephone switches that dedicate circuits end to end, unused bandwidth in ATM's logical circuits can be appropriated when needed. For example, idle bandwidth in a videoconference circuit can be used to transfer data. ATM is widely used as a backbone technology in carrier networks and large enterprises.

Consistent QoS is highly dependent on the efficiency of routing protocols implemented by the networks. PNNI (Private Network-to-Network Interface) is a routing protocol used between ATM switches in an ATM network. PNNI lets the switches inform each other about network topology so they can make appropriate forwarding decisions. A primary objective of PNNI is to enable ATM switches to dynamically reroute packets based on current network line conditions.

The PNNI specification was developed by the ATM Forum to provide a crankback mechanism to do alternate routing when the connection setup in progress encounters a failure in the network. In such a case, when a connection problem or failure is detected, the specification defines the manner in which the switches reroute a connection to avoid the problem.

However, there is a limitation in the ATM Forum PNNI specification with respect to crankbacks. The problem is how the crankbacks are handled by the entry border nodes in the multi-peer group networks. In multi-peer group networks, the nodes in a peer group know only about the nodes within the peer group and have only summarized information of nodes outside the peer group. Due to this information being aggregated, the exact crankback location cannot be specified outside the peer group.

If the entry border of a peer group cannot route a call to the destination and if the cause of call failure is within the peer group, then, according to the ATMF PNNI specification, the entry border node specifies that the crankback has occurred at the next higher level. This is because the entry border node cannot exactly specify to the source node which peer groupe node has the failure.

This higher level crankback is translated to a blocked node of the logical group node and so, the source node processing this crankback would treat the whole peer group as blocked. If this entry border node crankback happens on the destination peer group, or if it happens on a transit peer group that is the only route to reach the destination node, then the calls and/or connections will never get routed. The failure to complete the call, even though sufficient ATM switch resources are available to do so, defeats the purpose of QoS configuration of the ATM switches. This problem has been widely observed in many multi-peer group deployments. There is no solution available through PNNI or other standards.

Thus, what is needed is a solution that can efficiently handle crankback rerouting in multi-peer group networks. The needed solution should be compatible with existing network standards.

DISCLOSURE OF THE INVENTION

Embodiments of the present invention provide a method system for enhancing crankback handling in multi-peer group networks. Embodiments of the present invention efficiently handle crankback rerouting in multi-peer group networks. Embodiments of the present invention are compatible with existing network standards.

In one embodiment, the present invention is implemented as a method for crankback handling in a multi-peer group network. The method includes receiving a first connection request from a node of a first peer group (e.g., a preceding peer group). Upon detection of a call failure within a second peer group (e.g., a succeeding peer group), a crankback is transmitted from the second peer group to the first peer group. The crankback specifies a blocked interface at a first link between the first peer group and the second peer group. The crankback is transmitted from a node of the second peer group. A second connection request is subsequently received from the node of the first peer group. The second connection request uses a second link to the second peer group that avoids the call failure. The blocked interface causes the originating node to use an alternate exit border node node within the first peer group to implement the second link to the second peer group.

In one embodiment, the node of the second peer group (e.g., the succeeding peer group) is an entry border node configured to receive connection requests for the peer group. In one embodiment, the node is an ATM switch of an ATM network operating in accordance with a PNNI specification.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail as not to unnecessarily obscure aspects of the present invention.

Embodiments of the present invention provide a method system for enhancing crankback handling in multi-peer group networks. Embodiments of the present invention efficiently handle crankback rerouting in multi-peer group networks. Embodiments of the present invention are compatible with existing network standards. The present invention and its benefits are further described below.

Figure 1:
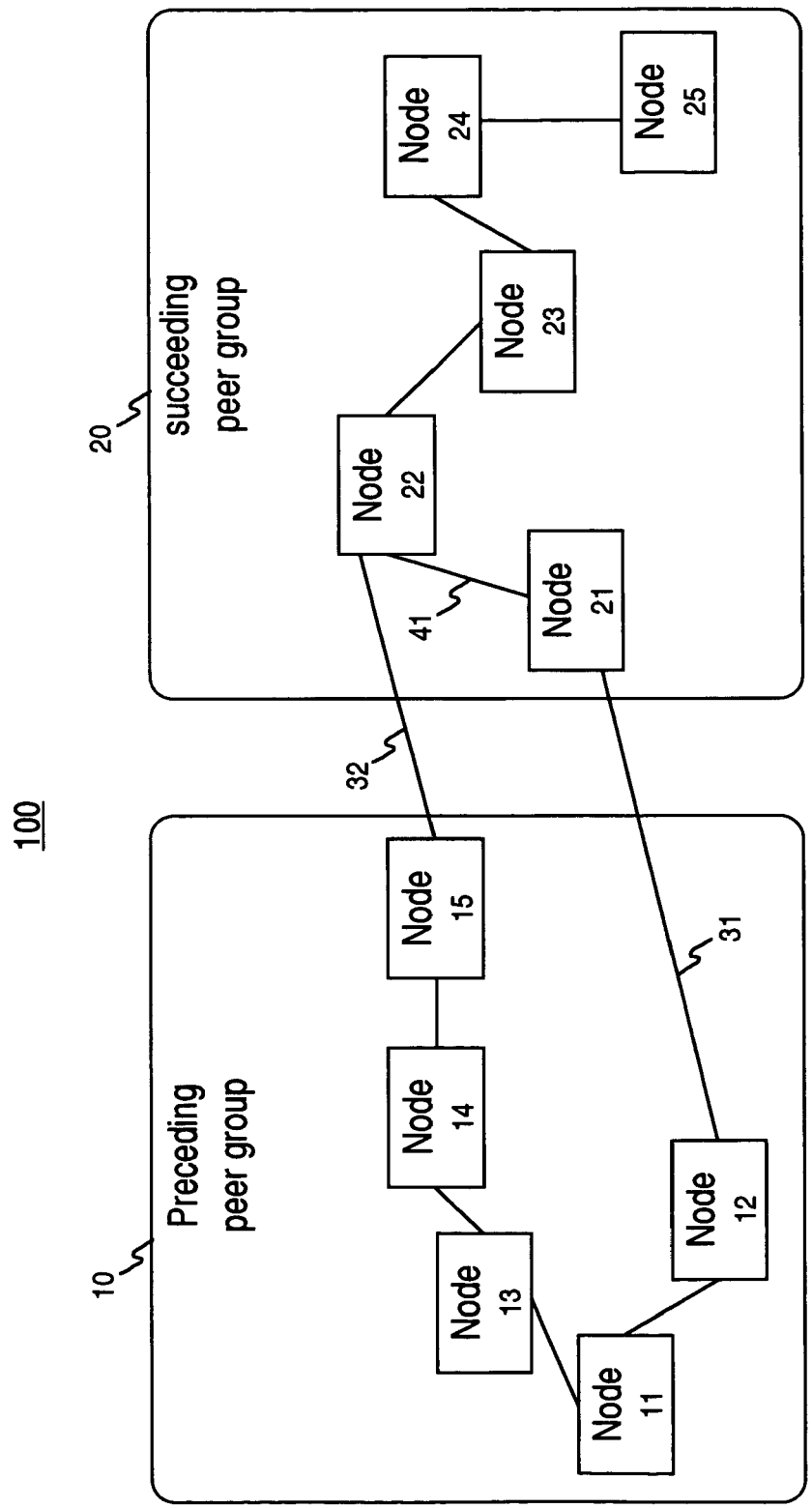
FIG. 1 shows a diagram illustrating a first network configuration in accordance with one embodiment of the present invention.

FIG. 1 shows a diagram illustrating a network 100 in accordance with one embodiment of the present invention. As depicted in FIG. 1, the network 100 includes a plurality of nodes 11-25 coupled by network communication links as shown. Nodes 11-15 are included in a peer group 10 (e.g., a preceding peer group). Nodes 21-25 are included in a peer group 20 (e.g., a succeeding peer group).

The network 100 embodiment of the present invention functions by implementing an enhanced crankback mechanism for handling connection failures between the nodes of the peer groups 10 and 20. As depicted in FIG. 1, each of the nodes 11-25 comprise one or more ATM switches. The network 100 is an ATM based network.

The ATM switches comprising the nodes 11-25 function as packet switches, transmitting all traffic as fixed-length, 53-byte cells. As known by those skilled in the art, this fixed unit allows very fast switches to be built, because it is much faster to process a known packet size than to Figure out the start and end of variable length packets. The small ATM packet also ensures that voice and video can be inserted into the stream often enough for realtime transmission.

The ATM switches comprising the nodes 11-25 are able to coordinate their transmission capacity in order to specify a quality of service (QoS). QoS control is one of ATM's most important features, allowing voice and video to be transmitted smoothly. Differing levels of service include, for example, Constant Bit Rate (CBR) that guarantees bandwidth for real-time voice and video, Realtime variable Bit Rate (rt-VBR) that supports interactive multimedia that requires minimal delays, and Available Bit Rate (ABR) that adjusts bandwidth according to congestion levels for LAN traffic.

The network 100 embodiment of the present invention implements an enhanced crankback mechanism in order to provide a reliable, consistent QoS. The network 100 embodiment extends the capabilities and functionality specified in the PNNI routing protocols used between ATM switches in an ATM network. PNNI is the basic routing standard through which ATM switches inform each other about network topology so they can make appropriate forwarding decisions. The PNNI specification defines the manner in which the ATM switches reroute a connection to avoid any link or connection problems. However, prior art PNNI implementations are inefficient in their ability to reroute connections in the case of failures within a peer group. In contrast, the enhanced crankback mechanism provided by embodiments of the present invention eliminate this inefficiency, in part by making greater use of the ATM switch topology within the various peer groups to overcome bad links or connection failures.

Referring still to FIG. 1, in a case where node 11 is a source, or originating node, of group 10, and where node 21 is a destination, or destination node, of group 20, the shortest path for reaching group 20 from group 10 is to take the link 31 out of node 12 in group 10. In accordance with the prior art, if link 41 in group 20 has a problem (e.g., such as a problem where it has run out of resources or if the entry border node is transit restricted), the entry border node 21 of group 20 would translate the crankback to the next higher level as there is no path for it to reach the destination. This would be seen by the source node 11 as the whole peer group 20 being blocked. Therefore it would not even choose the link 32 through node 15 to node 22 even though there are resources available in that path to reach the destination. Embodiments of the present invention solve this problem by recognizing the alternate path of link 32.

The network 100 embodiment of FIG. 1 uses a DTL (Designated Transit List) to discover the originating peer group. The DTL is a data structure that describes the path taken by a message as it transits a network. The DTL informs the entry border node 21 which peer group is transmitting this call. The entry border node 21 also has information of other border nodes in its peer group that have connectivity to the peer group initiating this call.

In the present embodiment, if the entry border node 21 encounters a failure to route a call to the destination node (e.g., node 25) and it discovers that there are other nodes in the peer group having connectivity to the same preceding peer group (e.g., group 10) through which the call has come, it can generate the crankback as blocked at the succeeding end of a blocked interface. This is another standard ATM Forum PNNI crankback type.

In the present embodiment, the blocked interface will be specified as the border link (e.g., link 31) between the entry border node 21 and the preceding peer group 10. If the preceding peer group 10 receives this crankback type as the succeeding end of blocked interface, the peer group 10 will avoid that link (e.g., link 31) and use another path to reach the destination, instead of treating the whole peer group 20 as blocked.

For example, referring still to FIG. 1, in a case where the entry border node 21 has a failure to route the call to the destination node 25, the entry border node 21 knows that there is connectivity to the preceding peer group 10 also through node 22. Therefore, in accordance with embodiments of the present invention, the entry border node 21 would return the crankback as a succeeding end of a blocked interface instead of returning a crankback specifying that the whole peer group 20 is blocked. The blocked interface would be specified as the interface between node 12 and node 21. The source node 12 would try the alternate route through node 15 and would reach the destination via link 32 instead of failing the connection permanently.

Thus, the network 100 embodiment in accordance with the present invention addresses the crankback problems when there are many border nodes with connectivity to the preceding peer groups and the entry border node has only one link coming from the preceding peer group.

Figure 2:
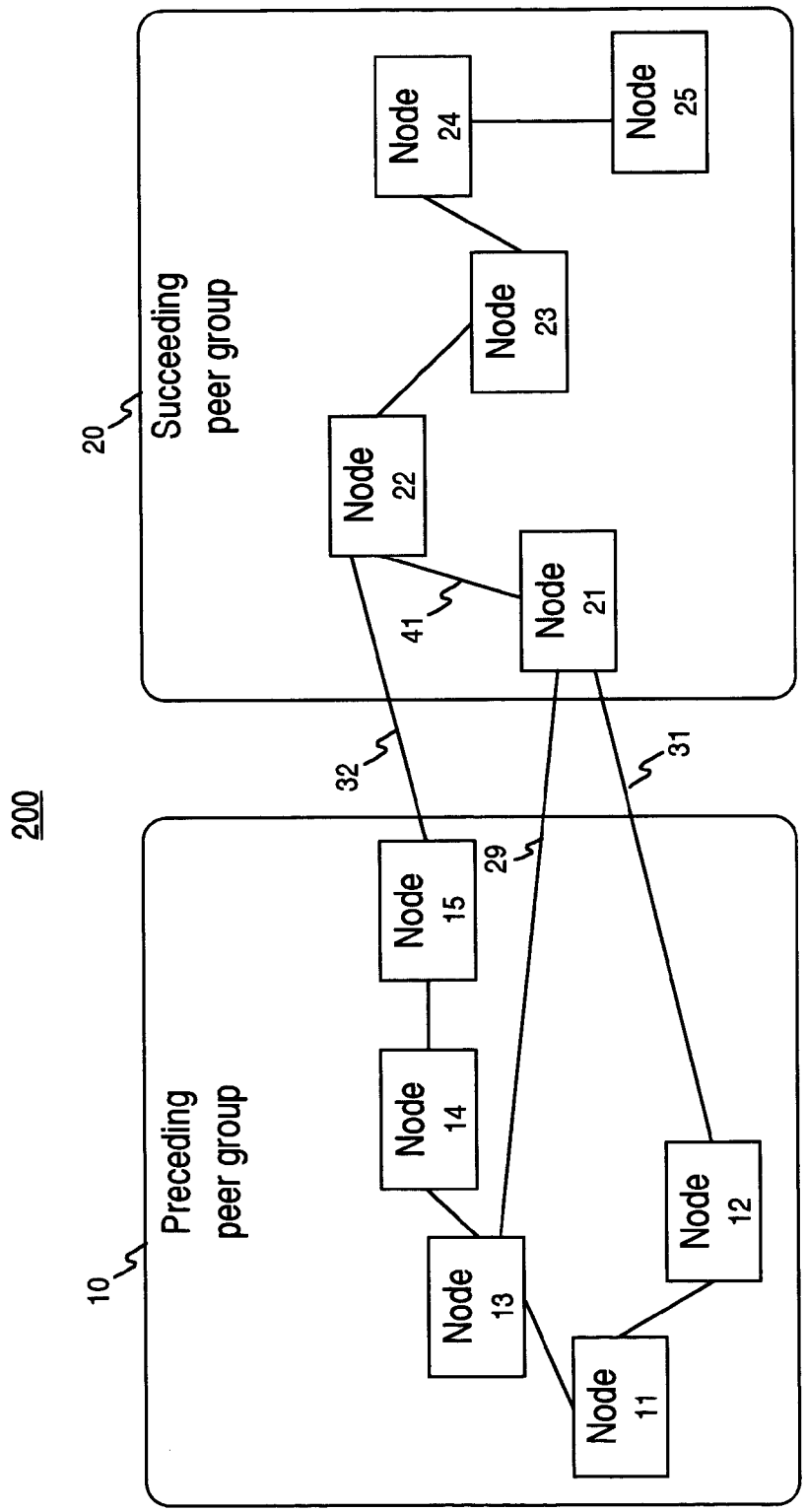
FIG. 2 shows a diagram illustrating a second network configuration in accordance with one embodiment of the present invention.

Referring to FIG. 2, a diagram of a network 200 configuration in accordance with one embodiment of the present invention is shown. As shown in FIG. 2, the network 200 configuration includes the preceding peer group 10 and the succeeding peer group 20 as in FIG. 1. However, the network 200 configuration shows a case where the same entry border node 21 has multiple links (e.g., link 29 and link 31) to the preceding peer group 10.

In the network 200 embodiment, the entry border node 21 has two links coming from peer group 10, one from node 12 and one from node 13. In this case, when the entry border node 21 returns the succeeding end of a blocked interface to the preceding peer group 10, node 11 would retry the connection through node 13 and will face the same failure from entry border node 21 (e.g., on link 41).

The network 200 embodiment of the present invention addresses this problem by configuring the entry border node 21 to transport the node IDs of the exit border nodes (e.g., nodes 12-13, and node 15) in the preceding peer group 10 that have connectivity to this node. The border node 21 has this information through the "hello" exchange over the outside links (e.g., links 31-32 and link 29). PNNI signaling provides for the transport of application specific information to be carried over the GAT (Generic application Transport) Information Element (IE) in the RELEASE message.

The network 200 embodiment of the present invention uses the GAT IE as a list to transport the exit border node IDs of the preceding peer group 10 that are connected to this blocked entry border node 21. This information is transported using an organization specific application type in the GAT IE. In one embodiment, the OUI is a Cisco OUI (Organization Unique Identifier). The preceding peer group 10 can use this information to avoid the exact nodes connected to the blocked node in the next peer group.

Thus, as shown in FIG. 2, the entry border node 21 can specify that the nodes connecting to it from the preceding peer group are node 12 and node 13. This information can be used by source node 11 to determine a better path through node 15 and link 32.

Figure 3:
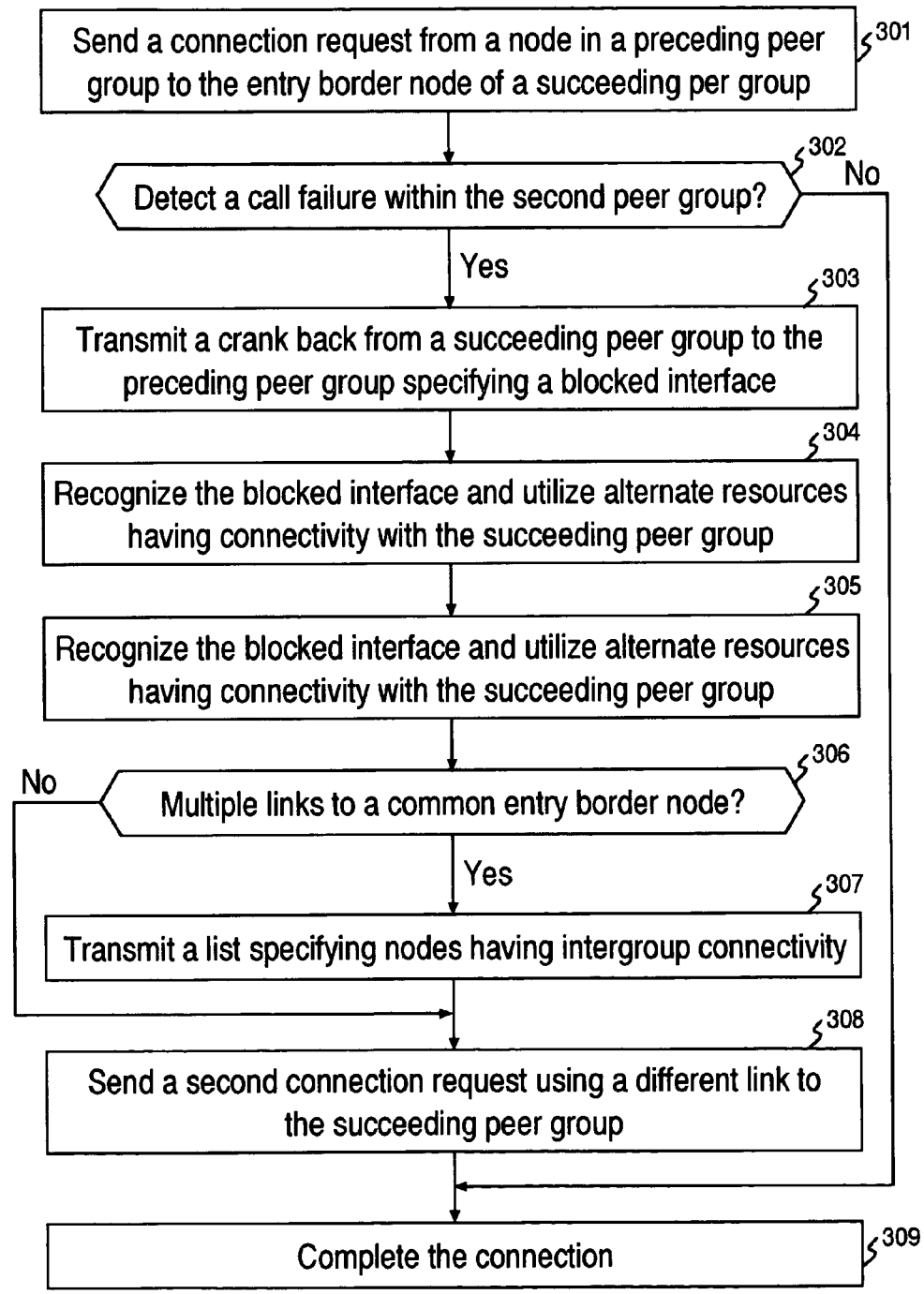
FIG. 3 shows a flowchart of the steps of an enhanced crankback process as practiced by a network in accordance with one embodiment of the present invention.

FIG. 3 shows a flowchart of a process 300 in accordance with one embodiment of the present invention. As depicted in FIG. 3, process 300 shows the steps of an enhanced crankback process as practiced by a network (e.g., network 100) in accordance with one embodiment of the present invention.

Process 300 begins in step 301, where an exit border node (e.g., node 12) in a preceding peer group transmits a connection request to the entry border node (e.g., node 21) of the succeeding peer group. In step 302, if a call failure is detected, process 300 proceeds to step 303. If no call failure is detected, process 300 proceeds directly to step 308 and completes the connection.

In step 303, in the case of a call failure, a determination is made as to whether multiple links exist to a common entry border node. As described above, in this case, the originating node needs information that will allow it to recognize that more than one link leads to the blocked entry border node. If multiple links do not exist, in step 304, a crankback is transmitted from the succeeding peer group to the preceding peer group specifying a blocked interface. As described above, this blocked interface is described as being the link (e.g., link 31) between the exit border node of the preceding peer group and the entry border node of the succeeding peer group. Process 300 then proceeds to step 306.

In step 303, if multiple links do exist, process 300 proceeds to step 305, where the blocked entry border node transmits a crank back (e.g., as described above) and transmits a list specifying those nodes that have intergroup connectivity. As described above, the blocked entry border node transmits a list specifying node IDs of the exit border nodes (e.g., nodes 12-13, and node 15 of FIG. 2) in the preceding peer group 10 that have connectivity to this node.

In step 306, the originating node (e.g., node 11) recognizes the blocked interface and utilizes alternate resources within its peer group having connectivity with the succeeding peer group (e.g., node 15). Subsequently, in step 307, a second connection request can be transmitted from the originating node 11 that utilizes a different link (e.g., link 32) to the succeeding peer group. In step 309, the connection is then completed.

Computer System Environment

Figure 4:
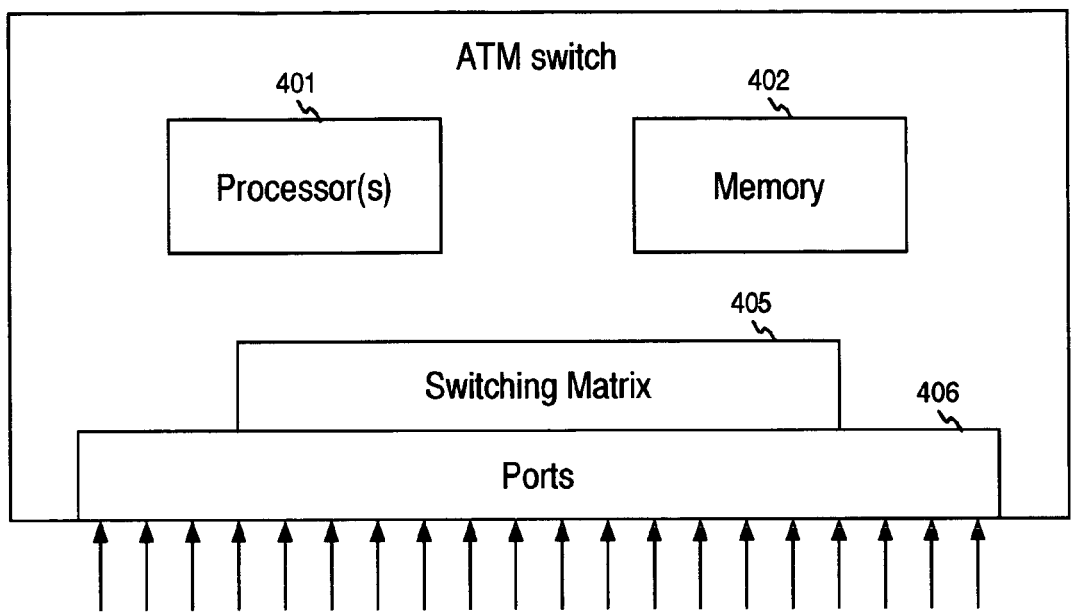
FIG. 4 shows a general block diagram of an ATM switch in accordance with one embodiment of the present invention.

Referring to FIG. 4, an ATM switch 400 is illustrated. As described in the above discussions of the present invention, certain processes and steps are discussed that are realized, in one embodiment, as a series of instructions (e.g., a software program, software code, etc.) that reside within a computer readable memory 402 of an ATM switch 400 and are executed by one or more processors 401 of the switch 400. When executed, the instructions cause switch 400 to perform the specific functions and exhibit the specific behavior which was described in detail above. A generalized example of such a switch operable to implement the elements and functions of the present invention is shown in FIG. 4.

In general, the ATM switch 400 of the present invention includes one or more central processor(s) 401 configured to access data and instructions from a computer readable memory 402 (e.g., random access memory, static RAM, dynamic RAM, etc.). The switch 400 also includes a switching matrix 405 for implementing the packet switching for the packets received via a plurality of ports 406.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A method for crankback handling in a multi-peer group network, comprising:

receiving, at a first node of a succeeding peer group a first connection request from a first node of a preceding peer group;

detecting a call failure occurring between nodes within the succeeding peer group, the detected call failure occurring at a location inside the succeeding peer group wherein the succeeding peer group is a different peer group from the preceding peer group;

determining whether multiple nodes in the succeeding peer group have connectivity to the preceding peer group;

determining whether multiple nodes of the preceding peer group have connectivity to the first node of the succeeding peer group;

transmitting a succeeding end crankback rather than a next higher level crankback from the succeeding peer group to the preceding peer group if multiple nodes in the succeeding peer group have connectivity to the preceding peer group and multiple nodes of the preceding peer group do not have connectivity to the first node of the succeeding peer group;

wherein the succeeding end crankback specifies a blocked interface at a first link between the preceding peer group and the succeeding peer group;

wherein the first link is located outside the preceding peer group and located outside of the succeeding peer group; and wherein the succeeding end crankback is transmitted from the first node of the succeeding peer group;

receiving a second connection request from the preceding peer group, the second connection request using a second link to the succeeding peer group that avoids the call failure;

wherein the second link is between the first node of the first peer group and a second node of the second peer group or a second node of the preceding peer group and the second node of the second peer group.

2. The method of claim 1 wherein the first node of the succeeding peer group is an entry border node configured to receive connection requests for the succeeding peer group.

3. The method of claim 1 wherein the blocked interface is specified between an originating node in the preceding peer group and an entry border node in the succeeding peer group.

4. The method of claim 3 wherein the blocked interface causes the originating node to use an alternate exit border node within the preceding peer group to implement the second link to the succeeding peer group.

5. The method of claim 1 wherein the network is an ATM (asynchronous transfer mode) network.

6. The method of claim 5 wherein the first node of the succeeding peer group is configured to use a DTL (Designated Transit List) to discover the first connection request was transmitted from the preceding peer group.

7. The method of claim 6 further comprising:

transmitting a list from the first node in the succeeding peer group to the first node in the preceding peer group, the list specifying nodes in the preceding peer group that have connectivity with the first node in the succeeding peer group; and using the information in the list to transmit the second connection request to ensure the second link avoids the first node of the succeeding peer group;

wherein the list is transmitted in a GAT IE (Generic Application Transport Information Element).

8. A packet switch for crankback handling in a multi-peer group network comprising:

means for receiving a first connection request from a node of a first peer group;

means for detecting a call failure inside a second peer group;

means for discovering multiple nodes in the second peer group having connectivity to the first peer group;

means for discovering multiple nodes of the first peer group having connectivity to the packet switch;

means for generating a list of nodes of the first peer group having connectivity to the packet switch; and means for transmitting a succeeding end crankback rather than a next higher level crankback from the second peer group to the first peer group wherein transmitting corresponds to whether multiple nodes in the second peer group having connectivity to the first peer group are discovered and whether multiple nodes of the first peer group having connectivity to the packet switch are discovered;

wherein the succeeding end crankback specifies a blocked interface at a first link between the first peer group and the second peer group;

wherein the first link is outside the first peer group and outside of the second peer group;

wherein the succeeding end crankback causes the first peer group to send a second connection request, the second connection request using a second link to the second peer group that avoids the call failure; and wherein the second link is to be between the node of the preceding peer group and an alternate packet switch of the succeeding peer group or an alternate node of the preceding peer group and the alternate switch of the succeeding peer group.

9. The packet switch of claim 8 further comprising means for transmitting the next higher level crankback from the second peer group to the first peer group if multiple nodes in the second peer group having connectivity to the first peer group are not discovered.

10. The packet switch of claim 8 wherein the packet switch is an entry border node configured to receive connection requests for the second peer group and wherein the node of the first peer group is an exit border node.

11. The packet switch of claim 8 further comprising means for specifying the blocked interface is between an originating node in the first peer group and the packet switch in the second peer group.

12. The packet switch of claim 11 further comprising:

means for transmitting the list of nodes in the first peer group, wherein the first peer group uses the list to avoid the call failure on the second link;

wherein means for specifying the blocked interface causes the originating node to use an alternate exit border node within the first peer group to implement the second link to the second peer group.

13. The packet switch of claim 12:

wherein the packet switch is compatible with a version of a PNNI (private network to network interface) standard;

wherein the packet switch is an ATM switch; and wherein the list is transported in a GAT IE.

14. The packet switch of claim 13 wherein the ATM switch further comprises means for using a DTL (Designated Transit List) to discover the first connection request was transmitted from the first peer group.

15. A switch in a multi-peer group network operable to:

receive a first connection request from a first exit border node of a preceding peer group on a first link wherein the first connection request on the first link connects the first exit border node of the preceding peer group with the switch, wherein the switch is a first entry border node of a succeeding peer group and wherein the first link is outside the preceding peer group and the succeeding peer group;

detect a call failure inside the succeeding peer group;

identify one or more alternate entry border nodes in the succeeding peer group coupled to the preceding peer group capable of forming a second link between the preceding peer group and the succeeding peer group;

identify one or more exit border nodes in the preceding peer group coupled to the succeeding peer group via the switch; and transmit a crankback from the succeeding peer group to the preceding peer group, wherein the crankback specifies the first link as blocked at a succeeding end and wherein the crankback causes a second connection request from the preceding peer group, the second connection request using the second link to the succeeding peer group that avoids the call failure;

wherein transmitting is based at least in part on identifying one or more alternate entry border nodes in the succeeding peer group coupled to the preceding peer group capable of forming a second link between the preceding peer group and the succeeding peer group or identifying one or more exit border nodes in the preceding peer group coupled to the succeeding peer group via the switch, or combinations thereof; and wherein the second link is to be between the first exit border node of the preceding peer group and an alternate switch of the succeeding peer group or a second exit border node of the preceding peer group and an alternate switch of the succeeding peer group.

16. The switch of claim 15 wherein the crankback is a succeeding end crankback and wherein the succeeding end crankback is transmitted rather than a next higher level crankback.

17. The switch of claim 15 wherein the first link is specified between an originating node in the preceding peer group and the switch in the succeeding peer group.

18. The switch of claim 15 wherein the switch comprises an ATM switch.

19. The switch of claim 18 wherein the ATM switch is operable to use a Designated Transit List (DTL) to discover the first connection request was transmitted from the preceding peer group.

20. The switch of claim 15 wherein the switch is compatible with a version of a PNNI (private network to network interface) standard.

21. The switch of claim 20 further operable to:

transmit a list to a node in the preceding peer group, the list specifying the one or more exit border nodes in the preceding peer group identified as being coupled to the succeeding peer group via the switch, wherein the node uses the list to ensure the second link avoids the call failure.

22. The switch of claim 21 wherein the list is transported in a Generic Application Transport Information Element (GAT IE) using an organization specific application type.

23. The switch of claim 22 wherein the organization specific application type comprises a Cisco Organization Unique Identifier.

24. A switch in a multi-peer group network operable to:

send a first connection request from a preceding peer group on a first link wherein;

the switch is a first exit border node;

the connection request on the first link connects the first exit border node of the preceding peer group and a first entry border node of a succeeding peer group; and the first link is outside the preceding peer group and the succeeding peer group;

if one or more alternate entry border nodes in the succeeding peer group are coupled to the preceding peer group wherein the alternate entry border nodes are capable of forming a second link between the preceding peer group and the succeeding peer group and two or more exit border nodes in the preceding peer group are not coupled to the succeeding peer group via the switch then receive a crankback from the succeeding peer group, wherein the crankback specifies the first link as blocked between the first exit border node and the first entry border node if there is a call failure inside the succeeding peer group;

receive a list specifying nodes in the preceding peer group that have connectivity with the succeeding peer group via the first entry border node of the succeeding peer group;

send a second connection request on a second link to the succeeding peer group corresponding to the crankback wherein the second link connects the preceding peer group to the succeeding peer group via a second entry border node of the succeeding peer group;

select an alternate switch of the preceding peer group for establishing the second link to the succeeding peer group based at least in part on the list; and forward the crankback to the alternate switch wherein the alternate switch is operable to send the second connection request that avoids the call failure.

25. The switch of claim 24 wherein the list is received in a Generic Application Transport Information Element (GAT IE) using an organization specific application type.

26. The switch of claim 25 wherein the organization specific application type comprises a Cisco Organization Unique Identifier.

27. An entry border node containing circuitry configured to:

synchronize topology information with a plurality of peer switches contained in a local logical group, the topology information synchronized over intra group links that extend between the peer switches;

detect a disruption of a call extending between a destination one of the peer switches and a source located in a remote logical group, wherein the remote logical group does not participate in the topology information synchronizations, wherein the call extends over an inter group link extending between one of the peer switches and a network component operating outside the local logical group;

prior to sending a first type of crankback message to the source for the detected call disruption, determine whether one of the peer switches besides the destination peer switch has connectivity with the remote logical group;

if one of the peer switches besides the destination peer switch has connectivity with the remote logical group, do not send the first type of crankback message, and instead send a second different type of crankback message, wherein the second type of crankback message indicates communication disruption over the inter group link when in fact the communication disruption is over one of the intra group links, the second type of crankback message indicating an inter group link failure even when there is no inter group link failure, the second type of crankback message configured to cause the source to reroute the call using a different inter group link; and otherwise, send the first type of crankback message if the second type of crankback message is not sent.

28. The entry border node of claim 27 wherein the first type of crankback message is configured to indicate to the source that communication with the local logical group is blocked.

29. The entry border node of claim 27 wherein the circuitry is further configured to:

determine whether the detected call disruption is caused by a local communication failure on one of the intra group links or on one of the peer switches;

if the detected call disruption is caused by a local communication failure, determine whether the local communication failure can be routed around by routing the call over the different inter group link;

if the detected call disruption is caused by the local communication failure, and if the call can be rerouted using the different inter group link, send the second type of crankback message to indicate an inter group link failure and cause rerouting over the different inter group link; and otherwise, send the first type of crankback message if the second type of crankback message is not sent.

* * * * *